(12) United States Patent
He et al.

(10) Patent No.: US 11,284,561 B2
(45) Date of Patent: Mar. 29, 2022

(54) AGRICULTURAL AIRCRAFT FOR SPREADING GRANULAR FERTILIZER AND SPREADING METHOD THEREOF

(71) Applicant: Zhejiang University, Hangzhou (CN)

(72) Inventors: Yong He, Hangzhou (CN); Yufei Liu, Hangzhou (CN); Hui Fang, Hangzhou (CN); Haiyan Cen, Hangzhou (CN); Hangyu Zhou, Hangzhou (CN); Zhengyu Zheng, Hangzhou (CN); Shiwei Yu, Hangzhou (CN)

(73) Assignee: Zhejiang University, Zhejiang (CN)

( * ) Notice: Subject to any disclaimer, the term of this patent is extended or adjusted under 35 U.S.C. 154(b) by 156 days.

(21) Appl. No.: 16/905,577

(22) Filed: Jun. 18, 2020

(65) Prior Publication Data

US 2021/0068339 A1 Mar. 11, 2021

(30) Foreign Application Priority Data

Sep. 11, 2019 (CN) .......................... 201910859227.4

(51) Int. Cl.
*A01C 17/00* (2006.01)
*A01C 21/00* (2006.01)
(Continued)

(52) U.S. Cl.
CPC .......... *A01C 17/008* (2013.01); *A01C 17/003* (2013.01); *A01C 21/007* (2013.01);
(Continued)

(58) Field of Classification Search
CPC ... A01C 17/008; A01C 17/003; A01C 21/007; A01C 17/006; A01C 17/00; A01C 21/00;
(Continued)

(56) References Cited

FOREIGN PATENT DOCUMENTS

| CN | 105918191 A | 9/2016 |
|----|-------------|--------|
| CN | 108770448 A | 11/2018 |

(Continued)

OTHER PUBLICATIONS

Sun Yueping, Zhao Dean, Hong Jianqing, et al. Design of Automatic and Uniform Feeding System Carried by Workboat and Effect Test for Raising River Crab[J], Transactions of the Chinese Society of Agricultural Engineering (Transactions of the CSAE), 2015, 31(11): 31-39.

(Continued)

*Primary Examiner* — Christopher J. Novosad
(74) *Attorney, Agent, or Firm* — Fish IP Law, LLP (57) ABSTRACT

An agricultural aircraft for spreading granular fertilizer and a spreading method thereof. The agricultural aircraft includes an aircraft body, a power system, and a spreading device, where the spreading device is located at a front part of the aircraft body, and the aircraft body is also provided at the front thereof with a wind direction sensor and a wind speed sensor communicatively connected a controller; the spreading device includes a box body, a throwing disc, and a tray connected to the box body, where a left baffle plate and a right baffle plate with controllable opening angles are disposed on the tray; an upper part of the box body is a material box for storing granular fertilizer, a cavity for accommodating the tray and the throwing disc is disposed on one side of the box body.

3 Claims, 6 Drawing Sheets

(51) Int. Cl.
*B64C 39/02* (2006.01)
*B64D 1/16* (2006.01)
(52) U.S. Cl.
CPC ............... *B64C 39/02* (2013.01); *B64D 1/16* (2013.01); *B64C 2201/12* (2013.01)
(58) Field of Classification Search
CPC .. B64D 1/16; B64D 1/00; B64C 39/02; B64C 39/00; B64C 2201/12; B64C 2201/00
See application file for complete search history.

(56) References Cited

FOREIGN PATENT DOCUMENTS

| | | |
|---|---|---|
| CN | 208490224 U | 2/2019 |
| CN | 208768744 U | 4/2019 |
| CN | 209134801 U | 7/2019 |

OTHER PUBLICATIONS

Office Action, Chinese application No. 201910859227.4, dated Jun. 18, 2020.
Office Action, Chinese application No. 201910859227.4, dated Jan. 14, 2021.

AGRICULTURAL AIRCRAFT FOR SPREADING GRANULAR FERTILIZER AND SPREADING METHOD THEREOF

TECHNICAL FIELD

The present invention relates to the field of agricultural automation aircraft technologies, and specifically, to an agricultural aircraft for spreading granular fertilizer and a spreading method thereof.

BACKGROUND

China is a big producer of rice and aquatic vegetables. In agricultural production, crops need to be fertilized for many times, and granular fertilizer is often applied. Currently, there are mainly the following three types of devices for spreading granular fertilizer in a paddy field:
1. Backpack-type device, for example, a granular fertilizer spreading device for planting in farmland disclosed in the patent CN108770448A. The device achieves spreading manually by an operator. When the device is applied in a paddy field of a large area, there is relatively high labor intensity, and large deviation between spreading evenness and a target value.
2. Agricultural device for spreading through small agricultural machinery, for example, an agricultural device for spreading granular fertilizer disclosed in the patent CN208490224U. The device imposes a relatively high requirement for a rice planting spacing. Moreover, wheels are easily swamped in the mud of a paddy field, and it is inconvenient to operate and easy to crush the rice and destroy the mud surface flatness of the paddy field. In addition, the device cannot operate in an aquatic vegetable field.
3 Unmanned aerial vehicle (UAV) spreading device, which has limited load and relatively short duration of flight. In addition, there exist defects such as a relatively large spreading drift and high costs.

In the prior art, an automatic bait feeding system carried by an aquaculture workboat is also proposed, in which concepts of an ordinary boat and a spreader are combined. Centrifugal force generated by the centrifugal motion is used to throw solid bait from a throwing disc relatively evenly in a relatively large spreading range. An ordinary boat can implement free spreading in a large range (Refer to the document: Design of Automatic and Uniform Feeding System Carried by Workboat and Effect Test for Raising River Crab). However, the device does not consider the influence of environmental wind disturbance on the evenness of bait spreading. In the bait feeding system for raising river crab, the boat body is less affected by the wind (breeze) during travelling due to its own weight, but the bait is greatly affected by the wind due to its relatively light weight.

SUMMARY

An objective of the present invention is to provide an agricultural aircraft for spreading granular fertilizer and a spreading method thereof, to resolve problems in the prior art that there is high labor intensity of granular fertilizer or herbicide spreading, a fertilizer drift caused due to the influence of the environmental wind leads to uneven spreading, etc. Moreover, the present invention implements automatic and efficient unmanned fertilization and weed removal in paddy fields.

To achieve the foregoing objective, the agricultural aircraft for spreading granular fertilizer provided in the present invention includes an aircraft body and a spreading device disposed on the body, where the spreading device includes:

A material box for storing granular fertilizer, where a discharge channel is disposed at the bottom of the material box;

A rotary throwing disc for carrying the granular fertilizer output from the discharge channel and spreading outward the granular fertilizer under the action of centrifugal force; and A left baffle plate and a right baffle plate movably disposed on both sides of the throwing disc and configured to adjust a fertilizer spreading range.

In the foregoing technical solution, after the granular fertilizer in the material box falls onto the rotary throwing disc through a material storage channel, the granular fertilizer is thrown outward under the action of centrifugal force of the throwing disc. By controlling opening angles of the left and right baffle plates, a throwing direction and an opening angle of the granular fertilizer are controlled. This resolves problems that there is high labor intensity of granular fertilizer or herbicide spreading and uneven spreading is caused because a fertilizer drift is easily caused due to the influence of the wind.

To control a discharging rate of the granular fertilizer, preferably, an opening corresponding to the discharge channel is disposed at the bottom of the material box, and a movable insertion piece is movably disposed at the opening and is configured to control a size of the opening.

Preferably, the bottom of the material box is funnel-shaped, and the opening is located at the neck of the funnel to facilitate concentrated discharging of the fertilizer. Preferably, the spreading device further includes a tray, the throwing disc is located above the tray, and the left baffle plate and the right baffle plate are disposed on the tray.

Preferably, a wind direction sensor, a wind speed sensor, and a controller are disposed on the aircraft body; and the controller adjusts a rotational speed of the throwing disc and angles of the left baffle plate and the right baffle plate according to received wind direction information and wind speed information.

Preferably, the controller conducts the following steps when controlling the throwing disc and the left and right baffle plates:
(1) Setting a throwing range of the granular fertilizer to a sector area with the throwing disc as a center point, and defining as "a" a first distance between two endpoints of an arc of the sector, and defining as "b" a second distance between a vertex of the sector and the throwing disc; and initializing operating parameters of various electronic devices according to a target spreading density value and specified values of a and b;
(2) Obtaining wind direction information and wind speed information;
(3) Determining a wind direction; and if the wind blows from a forward direction, conducting forward wind adjustment; or if the wind blows from a side direction, conducting side wind adjustment; and
(4) Determining, according to an instruction received by the controller, whether a spreading task is completed; and if the spreading task is completed, finishing spreading; or if the spreading task is not completed, repeating step (2) and step (3) to continue spreading until the spreading task is completed.

Compared with the prior art, the present invention has the following beneficial effects.

The agricultural aircraft for spreading granular fertilizer and a spreading method thereof in the present invention implement automatic and efficient unmanned fertilization and weed removal in paddy fields. Moreover, the present invention resolves problems in the prior art that there is high labor intensity of granular fertilizer or herbicide spreading, a fertilizer drift caused due to the influence of the environmental wind leads to uneven spreading, etc.

DETAILED DESCRIPTION

To make the objective, the technical solutions, and advantages of the present invention clearer, the following further describes the present invention with reference to examples and the accompanying drawings in the examples.

Example

Figure 1:
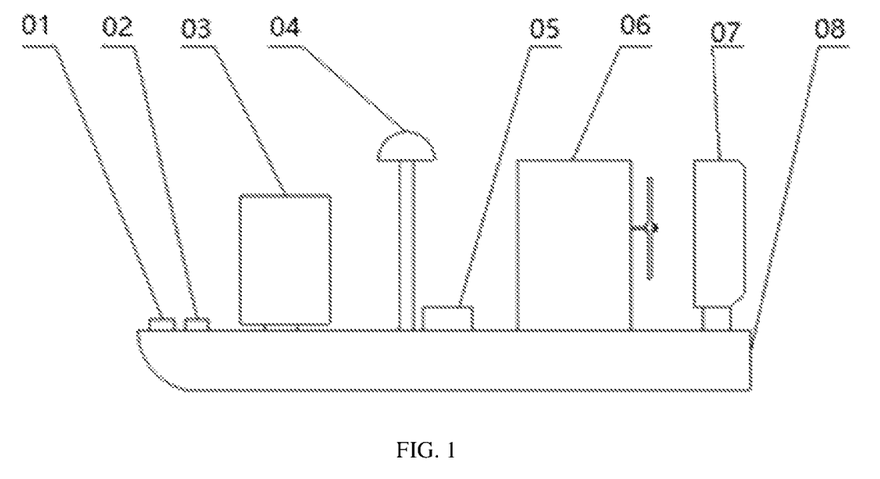
FIG. 1 is a schematic overall structural diagram of an agricultural aircraft according to an example of the present invention.
Figure 3:
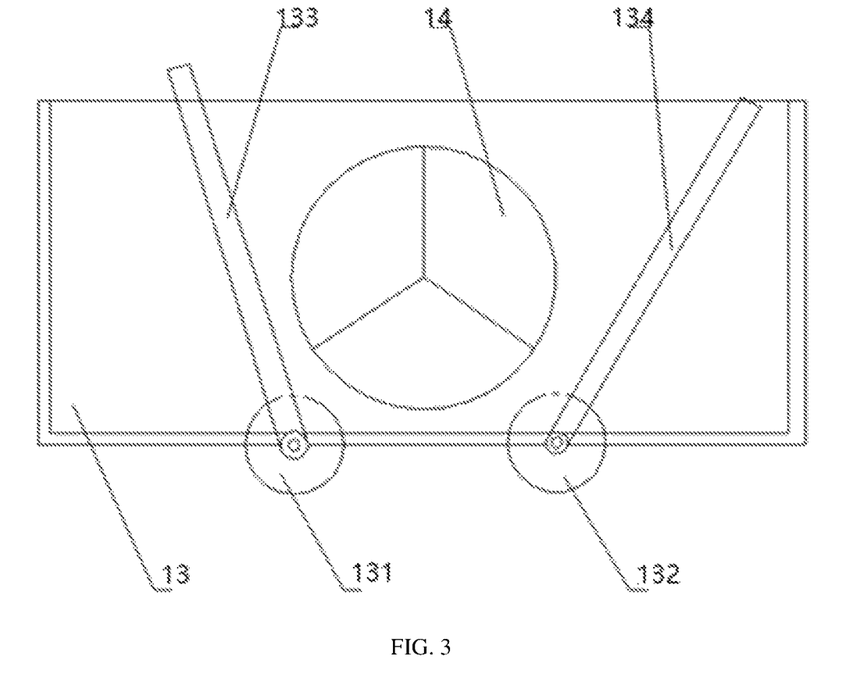
FIG. 3 is a schematic mechanism diagram of a tray according to an example of the present invention.

Referring to FIG. 1 and FIG. 3, in this example, an agricultural aircraft for spreading granular fertilizer includes an aircraft body 08, a power system 06, a spreading device 03, a wind environment perception system, and a motor control system.

The power system 06 includes an engine frame, an engine, an air propeller, a storage battery, and the storage battery supplies power for the spreading device 03 and other boat-borne devices. The engine provides power output and drives the air propeller to rotate to produce pushing force, and a tail vane 07 is used for controlling a direction. The aircraft body 08 is further provided with a communications module 04 and a control system 05 configured to remotely control running of the boat.

A core of the motor control system of the spreading device is a controller 3, and the controller interacts with a boat-borne master controller through the communications module 04, receives an instruction such as target spreading density, and conducts automatic motor control. The environment wind perception system includes a wind direction sensor 01 and a wind speed sensor 02 that are disposed at windward positions of the boat's bow. The wind direction sensor 01 and the wind speed sensor 02 return back environmental wind information to the controller 3 in real time during the spreading operation.

Figure 2:
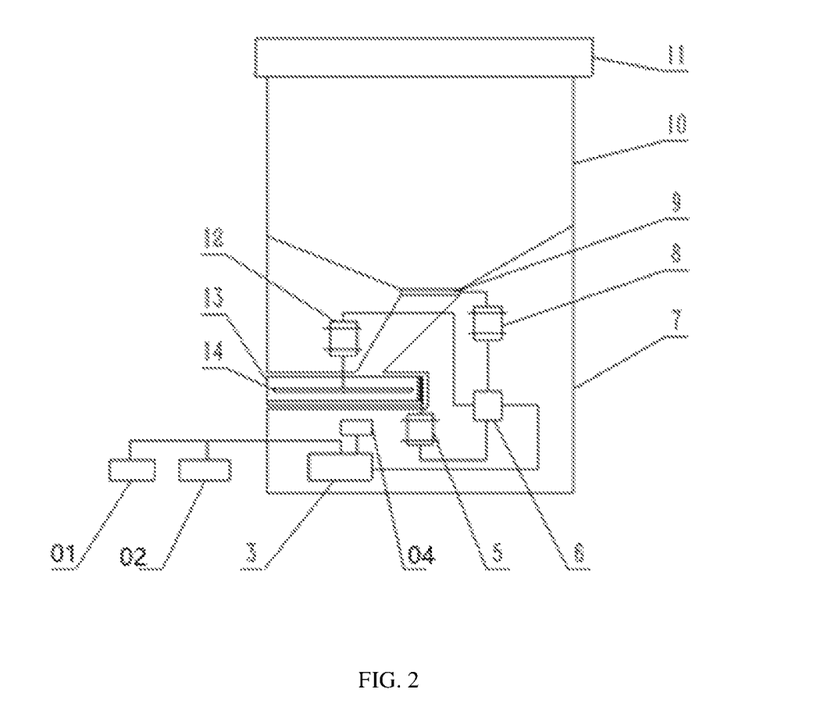
FIG. 2 is a schematic structural diagram of a spreading device according to an example of the present invention.

The spreading device 03 includes a box body 7, a tray 13, and a throwing disc 14, and a left baffle plate 133 and a right baffle plate 134 with controllable opening angles are disposed on the tray 13. An upper part of the box body 7 is a material box 10 for storing granular fertilizer; a cavity for accommodating the tray 13 and the throwing disc 14 is disposed on a side of the box body 03; a material storage channel communicated with the cavity is disposed at the bottom of the material box 10; and an upper lid 11 is disposed at the top of the material box. There are gaps between the tray 13 and upper and lower sides of the left baffle plate 133 and the right baffle plate 134, as well as between the material storage channel and the upper and lower sides of the left baffle plate 133 and the right baffle plate 134. A movable insertion piece 9 that is controlled by a steering engine 8 and that is configured to control an opening size of the material storage channel is disposed at the bottom of the material box 10.

In this example, a total of three steering engines and one motor are disposed, and the left baffle plate 133 and the right baffle plate 134 each are controlled by steering engines (131 and 132), and jointly control a horizontal throwing direction and opening angles. The steering engine 8 for controlling an opening of the material box is connected to the insertion piece 9 through a connecting rod, to control a size of the opening of the material box to control a feed quantity of the throwing disc 14, so as to control a spreading quantity per unit time. A throwing disc motor 12 is a direct current motor, is connected to the throwing disc 14 through a shaft coupling, and adjusts a throwing speed of the granular fertilizer by setting a rotational speed of the throwing disc motor. All the motors are controlled by the controller 3 through a driver module 6. A fertilizer channel is used for conveying the fertilizer, and is isolated from other subsystems such as the motor control system.

A steering engine combination 5 for tray angle control includes a left tray opening-angle control steering engine 131 for controlling an opening angle of the left baffle plate 133 and a right tray opening-angle control steering engine 132 for controlling an opening angle of the right baffle plate 134. The tray 13 is a continuous plane, is located below the throwing disc 14, and is connected to the box body 7 in FIG. 2. The baffle plate has a specific height, and a lower side and an upper side of the baffle plate are in clearance fit with the tray 13 and the fertilizer channel, to limit a throwing direction and an opening angle of the granular fertilizer.

Figure 6:
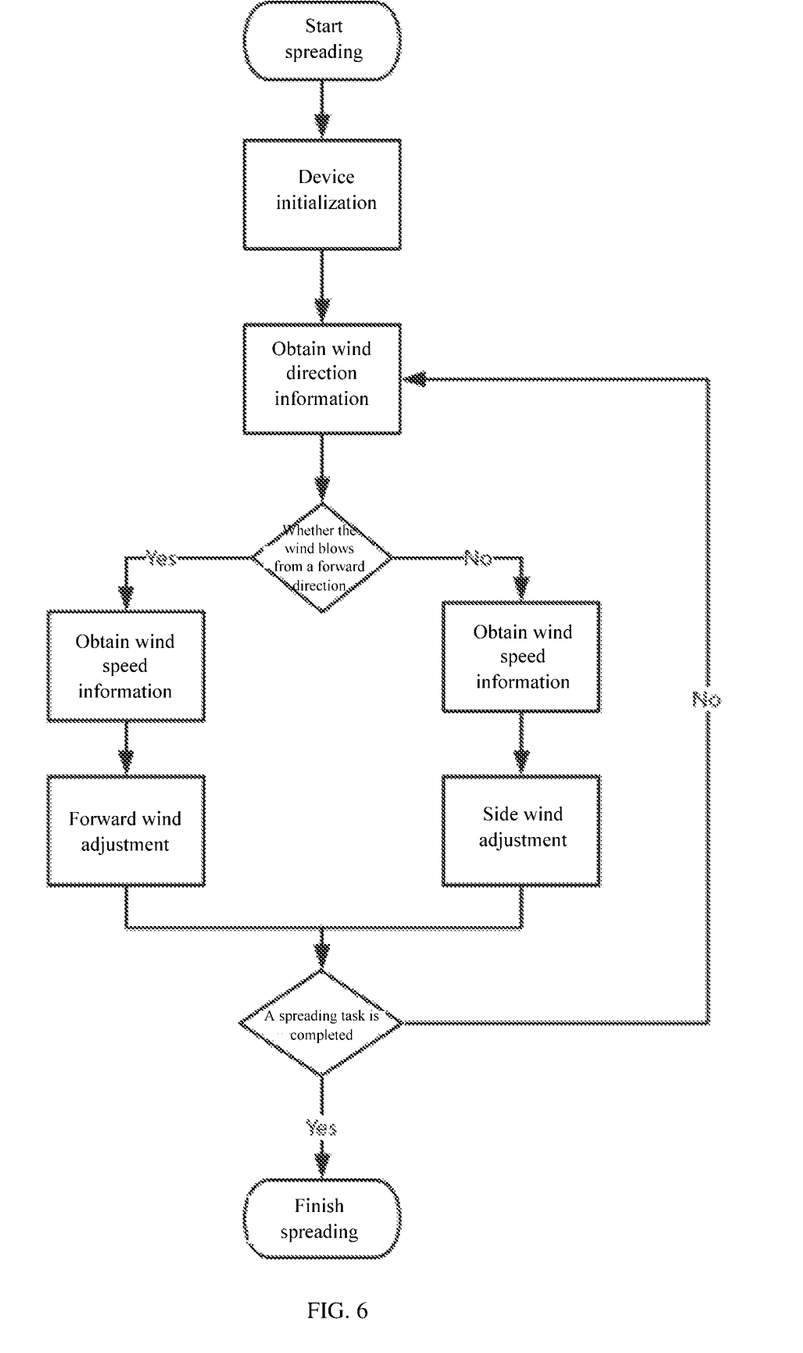
FIG. 6 is a flowchart of an implementation method for anti-wind spreading according to an example of the present invention.

As shown in FIG. 6, an implementation method for anti-wind spreading in the present invention is provided below, including the following steps:

Step (1). Initialize operating parameters of various electronic devices according to a received target spreading density value and specified values of a and b, so that the electronic devices operate normally and a spreading effect can satisfy all target values in an ideal condition.

Step (2). Obtain wind direction information by using a wind direction sensor.

Step (3). Determine a wind direction; and if the wind blows from a forward direction, further obtain wind speed information, and conduct forward wind adjustment control.

Step (4). If the wind blows from a side direction, further obtain wind speed information, and conduct side wind adjustment control Step (5). Determine, according to an instruction received by a controller, whether a spreading task is completed (the specific instruction is sent to the controller of a spreading device through a master controller of an aircraft body after it is determined by an operator that the spreading task is completed); and if the spreading task is completed, finish spreading; or if the spreading task is not completed, receive wind direction information according to step (2) to continue spreading.

Figure 4:
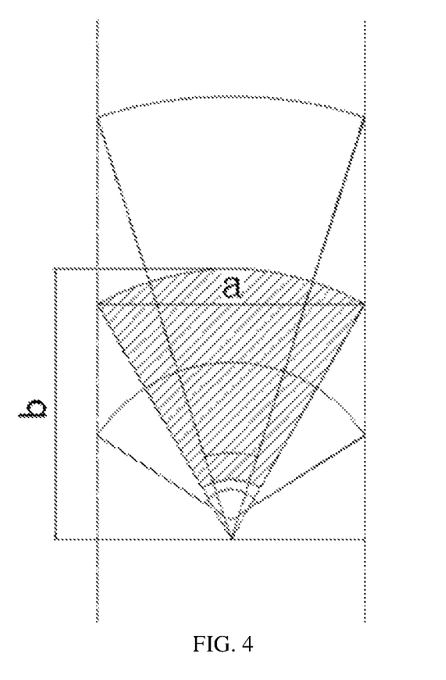
FIG. 4 is a schematic diagram of forward wind adjustment according to an example of the present invention.

A theoretical method of spreading control is as follows:

First, through mathematical model processing, in an ideal state, a throwing angle is limited, and a fertilizer throwing range is a sector area, as shown by a shaded area in FIG. 4. A width of the shaded area is defined as a, and a distance between a vertex of the shaded area and a throwing disc is defined as b (a dimension of the throwing disc relative to the throwing range is relatively small, and is regarded as a point). Left and right sidelines of this area are defined as lateral lines, and an upper and lower boundary line of this area are respectively defined as a top line and a bottom line. Because a spreading falling-point range cannot be detected in real time during a spreading operation, and only values of a and b can be provided in advance, and assuming that the values are invariable, a traveling route is planned. Therefore, when spreading is conducted in the complex environmental wind, a relatively good spreading effect can be achieved provided that the values of a and b value are invariable, so as to implement anti-wind spreading.

A specific adjustment method varies depending on a wind direction, and specific adjustment methods are divided into two types: forward wind adjustment and side wind adjustment. A spreading effect of the aircraft during traveling in waters when there is no wind or when an environmental wind direction is parallel to a traveling route is mainly affected by the forward wind. As shown in FIG. 4, for an expected spreading range and values of a and b, refer to the shaded part in the figure. If the spreading effect is affected by the forward wind at this time, no adjustment is conducted, the value of a of the spreading range is invariable, and the value of b decreases. Refer to an area with a smallest value of b in the figure. To keep the values of a and b stable, it is necessary to reduce a throwing angle and increase a throwing speed, to make a spreading range in an ideal state be a sector area corresponding to a largest value of b. Then, considering that the forward wind can lead to a decrease in the value of b, the value of b can be kept unchanged. The values of a and b can be kept unchanged in the forward wind environment only by keeping the value of a unchanged and the value of b value larger than an expected value.

Figure 7:
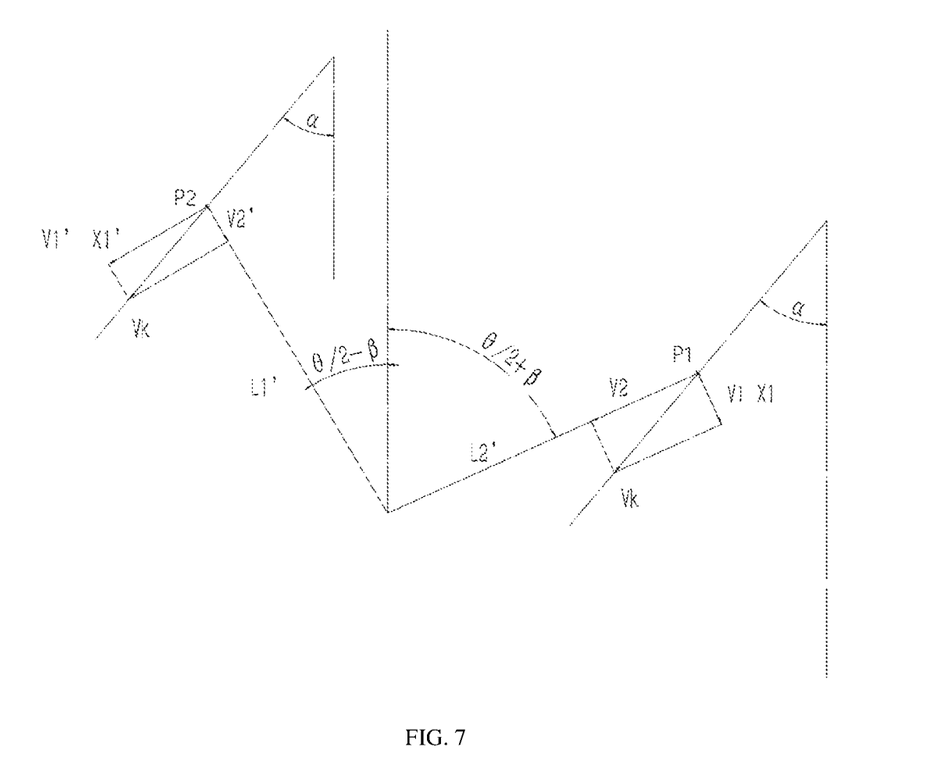
FIG. 7 is an illustration diagram of a forward wind adjustment formula according to an example of the present invention.

The following further describes the forward wind adjustment process by using FIG. 7 as a specific implementation example:

In a falling-point relationship expression used when only forward wind or reverse wind is considered, H is a displacement of parabolic motion in a vertical direction, that is, a height of a spreading plate, L is a horizontal displacement, and $V_0$ is a throwing speed.

Because $v^2=2ax$, in the vertical direction, $$H = \int_0^{v_y} \frac{1}{2a_y} dv^2 = \int_0^{v_y} \frac{1}{2g - \frac{kv^2}{m}} dv^2 = -\frac{m}{k} \ln\left(1 - \frac{kv_y^2}{2gm}\right)$$

where a is an acceleration; m is the mass of a single granular fertilizer granule; g is a gravitational acceleration, k=CρS (where C is a coefficient of air resistance, p is air density, and S is a windward area of an object); $a_y$ is an acceleration in the vertical direction when the granular fertilizer granule is in parabolic motion; $v_y$ is a speed in the vertical direction when the granular fertilizer granule falls onto the ground; and $$v_y = \sqrt{\frac{2gm}{k}\left(1 - e^{-\frac{kH}{m}}\right)}.$$

Related time: (considered in the vertical direction)

$$dv = \left(g - \frac{kv^2}{2m}\right)dt \Leftrightarrow \frac{dv}{g - \frac{kv^2}{2m}} = dt \Leftrightarrow -\frac{2m}{k} \frac{dv}{\left(v - \sqrt{\frac{2mg}{k}}\right)\left(v + \sqrt{\frac{2mg}{k}}\right)} = dt$$

Integral calculation is conducted to obtain $$-\frac{4m}{k}\sqrt{\frac{2mg}{k}}\left(\ln\left(v_y - \sqrt{\frac{2mg}{k}}\right) - \ln\left(v_y + \sqrt{\frac{2mg}{k}}\right)\right) = t.$$

Therefore, a time for the granular fertilizer granule from being thrown from the spreading plate to falling onto the ground is as follows:

$$t = 4\sqrt{\frac{2m^3g}{k^3}} \ln\left(1 + \frac{2}{\sqrt{\left(1 - e^{-\frac{kH}{m}}\right)^{-1}} - 1}\right)$$

Therefore, a horizontal distance of the granular fertilizer granule from a throwing point on the spreading plate to a falling point on the ground is as follows:

$$L = \int_{v_0}^{v_x} \frac{1}{2a_x} dv^2 = -\int_{v_0}^{v_x} \frac{m}{k_y^2} dv^2 = \frac{m}{k}\ln\left(\frac{v_0^2}{v_x^2}\right)$$

where $a_x$ is a motion acceleration in a horizontal direction when the granular fertilizer granule is in parabolic motion; $v_x$ is a speed in the horizontal direction when the granular fertilizer granule falls onto the ground; and $$v_x = \frac{2mv_0}{kv_0t + 2m} = \frac{2mv_0}{4v_0\sqrt{\frac{2m^3g}{k}}\ln\left(1 + \frac{2}{\sqrt{\left(1 - e^{-\frac{kH}{m}}\right)^{-1}} - 1}\right) + 2m}.$$

A range corresponding to $V_0$ is calculated herein by analyzing accelerated movement of the granule on a throwing disc:

$$\int_0^v dv^2 = \int_r^R 2w^2 r\, dr$$

$$v^2 = w^2(R^2 - r^2)$$

w is an angular speed of the throwing disc during rotation; R is a radius of a turnplate; and r is a distance of the sold fertilizer granule between a falling point on the throwing disc and a circle center of the throwing disc.

A radial velocity is as follows:

$$v^2 = \sqrt{w^2(R^2-r^2)} = w\sqrt{(R^2-r^2)}$$

Because a tangential velocity is as follows:

$$\omega R$$

A maximum value of an initial velocity is as follows:

$$v_{0max} = \sqrt{2}wR$$

A minimum value of the initial velocity is as follows:

$$v_{0min} = w\sqrt{2R^2 - T_2}$$ (where $T$ is a radius of a material throwing opening).

If an opening angle of a tray is $\theta$, $a = 2L_{max} \sin \theta/2$; and $b = (L_{max} - L_{min})\cos \theta/2$.

Figure 5:
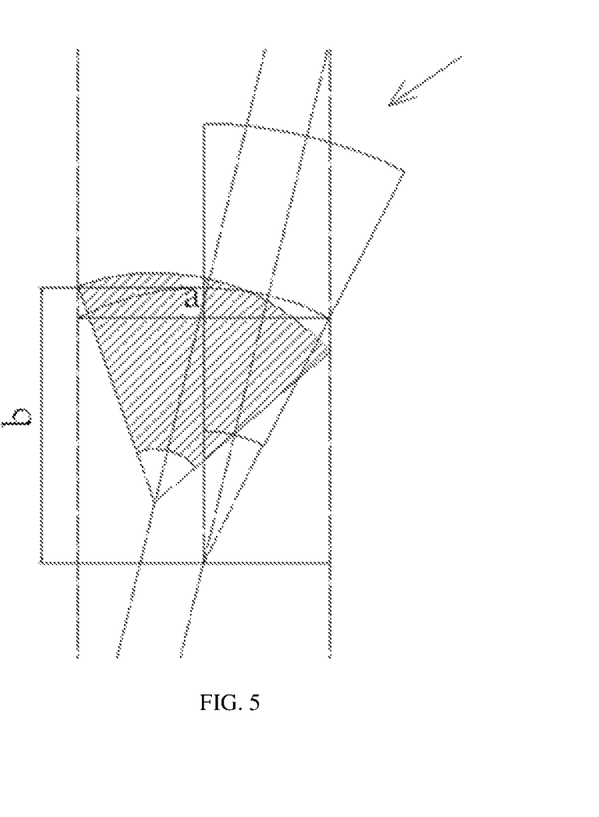
FIG. 5 is a schematic diagram of side wind adjustment according to an example of the present invention.

When the aircraft is affected by side wind during the spreading operation, the side wind causes the fertilizer to drift in a direction perpendicular to a traveling route direction and increases the value of a, and a forward wind component of the side wind decreases the value of b. As shown in FIG. 5, a shaded area is a final expected adjustment effect, and the values of a and b in the figure are specified expected values. A throwing angle needs to be changed and a throwing speed needs to be increased according to a wind direction and a wind speed, to make a spreading range in an ideal state be a sector area corresponding to a largest value of b and a smallest value of a in the figure. Then, considering that the forward wind component can decrease the value of b, wind perpendicular to the traveling route direction on the vertical lane direction can increase the value of a and causes a drift displacement, the final throwing effect is the shaded area, the value of a can be kept unchanged, and the value of b is basically kept unchanged.

How to calculate a required correction angle $\beta$ in a side wind condition is described herein.

It is assumed that a wind speed is Vk, P1 and P2 are respectively two endpoints in a broadening direction of a spreading range when there is no wind, V1 and V2 are respectively a tangential component and a radial component of a wind speed at P1, and V1' and V2' are respectively a tangential component and a radial component of a wind speed at P2. X1 and X1' are respectively offsets of the two area endpoints P1 and P2 in a direction perpendicular to a radial direction, and L1' and L2' are distances from a falling point in water to an origin of the throwing disc if there is only a radial component of the wind.

Originally, $a = 2L_{max} \sin \theta/2$, and it is assumed that an adjustment angle is $\beta$. A final value of the radial velocity at $P_1$ is calculated (when the fertilizer falls into water).

$$\frac{dv}{dt} = -\frac{k(v+v_2)^2}{2m} \Leftrightarrow v = \frac{2mv_0 - k + v_2(v_0+v_2)}{kt(v_0+v_2)+2m}$$ where $$v_0 = \sqrt{2}\omega R, \text{ and } t = 4\sqrt{\frac{2m^3g}{k^3}} \ln\left(1 + \frac{2}{\sqrt{1-e^{\frac{kH}{m}}}-1}\right);$$

$$v_x = \frac{2\sqrt{2}\, m\omega R + ktv_k \cos\left(\alpha - \frac{\theta}{2} - \beta\right)\left(\sqrt{2}\,\omega R + v_k \cos\left(\alpha - \frac{\theta}{2} - \beta\right)\right)}{kt\left(\sqrt{2}\,\omega R + v_k \cos\left(\alpha - \frac{\theta}{2} - \beta\right)\right) + 2m};$$

$$L_1' = \frac{m}{k}\ln\left(\frac{v_0^2}{v_x^2}\right);$$

and $x_1$ is calculated by using an integration method.

Similarly, $P_2$ is calculated as follows:

$$v_x = \frac{2\sqrt{2}\, m\omega R + ktv_k \cos\left(\beta - \frac{\theta}{2} - \alpha\right)\left(\sqrt{2}\,\omega R + v_k \cos\left(\beta - \frac{\theta}{2} - \alpha\right)\right)}{kt\left(\sqrt{2}\,\omega R + v_k \cos\left(\beta - \frac{\theta}{2} - \alpha\right)\right) + 2m};$$

$$L_2' = \frac{m}{k}\ln\left(\frac{v_0^2}{v_x^2}\right);$$

and $x_1'$ is calculated by using the integration method.

Figure 8:
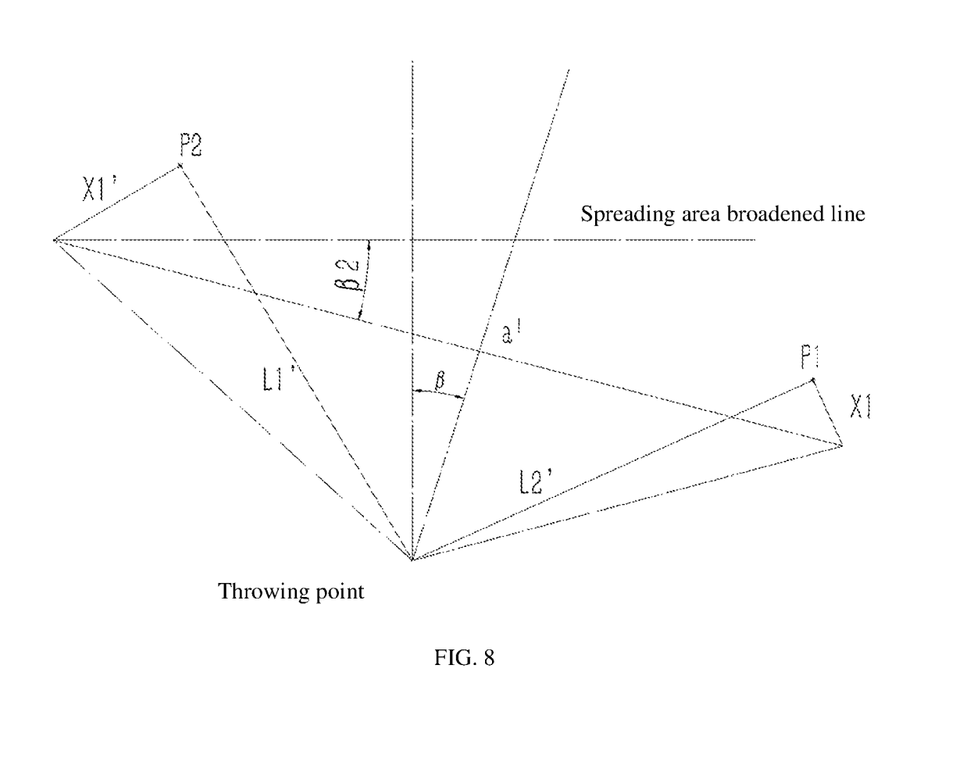
FIG. 8 is an illustration diagram of a side wind adjustment formula according to an example of the present invention.

Referring to FIG. 8, $\beta_2$ is first calculated according to a geometrical relationship, and $\beta$ is calculated by using $$a' = \frac{a}{\cos\beta_2}.$$

Because various angles and segment lengths in FIG. 8 all have been calculated, $\beta$ is uniquely determined, and a specific mathematical derivation process is not repeated herein.

What is claimed is:

1. An agricultural aircraft for spreading granular fertilizer, comprising an aircraft body and a spreading device disposed on the aircraft body, wherein the spreading device comprises:
   a material box for storing granular fertilizer, wherein a discharge channel is disposed at the bottom of the material box, wherein an opening corresponding to the discharge channel is disposed at a bottom of the material box, and a movable insertion piece is movably disposed at the opening and is configured to control a size of the opening;
   a rotary throwing disc for carrying the granular fertilizer output from the discharge channel, and spreading outward the granular fertilizer under the action of centrifugal force;
   a left baffle plate and a right baffle plate movably disposed on corresponding sides of the throwing disc, and configured to adjust a fertilizer spreading range;
   a wind direction sensor, a wind speed sensor, and a controller disposed on the aircraft body, wherein the controller adjusts (a) a rotational speed of the throwing disc and (b) angles of the left and right baffle plates according to received wind direction information and wind speed information;
   wherein the controller is configured to conduct the following steps when controlling a throwing disc and left and right baffle plates:
   (1) setting a throwing range of the granular fertilizer to a sector area with the throwing disc as a center point, and defining as "a" a first distance between two endpoints of an arc of the sector, and defining as "b" a second distance between a vertex of the sector and the throwing disc; and initializing operating parameters of various electronic devices according to a target spreading density value and specified values of a and b;
   (2) obtaining wind direction information and wind speed information;
   (3) determining a wind direction; and if the wind blows from a forward direction, conducting a forward wind adjustment; or if the wind blows from a side direction, conducting a side wind adjustment; and (4) determining, according to an instruction received by the controller, whether a spreading task is completed; and if the spreading task is completed, finishing spreading; or if the spreading task is not completed, repeating step (2) and step (3) to continue spreading until the spreading task is completed.

2. The agricultural aircraft for spreading granular fertilizer according to claim 1, wherein the bottom of the material box is funnel-shaped, and the opening is located at the neck of the funnel to facilitate concentrated discharging of the fertilizer.

3. The agricultural aircraft for spreading granular fertilizer according to claim 1, wherein the spreading device further comprises a tray, the throwing disc is located above the tray, and each of the left and right baffle plates is disposed on the tray.

* * * * *